(12) United States Patent
Yin

(10) Patent No.: US 11,292,345 B2
(45) Date of Patent: Apr. 5, 2022

(54) APPARATUS FOR CONTROLLING ENERGY FEEDBACK, BRAKING SYSTEM AND VEHICLE COMPRISING THE SAME

(71) Applicant: BIJIE TIANYU POWER TECHNOLOGY CO., LTD, Bijie (CN)

(72) Inventor: Tianming Yin, Bijie (CN)

(73) Assignee: BIJIE TIANYU POWER TECHNOLOGY CO., LTD, Bijie (CN)

( * ) Notice: Subject to any disclaimer, the term of this patent is extended or adjusted under 35 U.S.C. 154(b) by 204 days.

(21) Appl. No.: 16/449,315

(22) Filed: Jun. 21, 2019

(65) Prior Publication Data

US 2019/0308508 A1 Oct. 10, 2019

Related U.S. Application Data

(63) Continuation of application No. PCT/CN2016/111334, filed on Dec. 21, 2016.

(51) Int. Cl.
*B60L 7/18* (2006.01)
*B60L 15/20* (2006.01)
*B60L 7/14* (2006.01)

(52) U.S. Cl.
CPC .................. *B60L 7/18* (2013.01); *B60L 7/14* (2013.01); *B60L 15/2009* (2013.01); *B60L 2240/12* (2013.01); *B60L 2250/26* (2013.01)

(58) Field of Classification Search
None
See application file for complete search history.

(56) References Cited

U.S. PATENT DOCUMENTS

| | | | | |
|---|---|---|---|---|
| 2010/0089225 A1* | 4/2010 | Maruyama | ............ | G10H 1/348 84/626 |
| 2011/0233994 A1* | 9/2011 | Harding | ............... | B60W 10/184 303/152 |
| 2011/0267178 A1* | 11/2011 | Nishihara | ........... | B60L 15/2009 340/12.39 |
| 2012/0313426 A1 | 12/2012 | Walser | | |

(Continued)

FOREIGN PATENT DOCUMENTS

| | | |
|---|---|---|
| CN | 102700418 A | 10/2012 |
| CN | 103085785 A | 5/2013 |

(Continued)

*Primary Examiner* — Todd Melton
*Assistant Examiner* — Jason R Roberson

(57) ABSTRACT

An apparatus for controlling energy feedback, a braking system and a vehicle are disclosed. The apparatus includes a housing; an actuating assembly, received in the housing and movable back and forth between a first position and a second position along an axial direction of the housing; a first control member for a stop lamp, received in the housing and configured to trigger the stop lamp to be turned on or off along with a back-and-forth movement of the actuating assembly; and a second control member for energy feedback, at least partially received in the housing. The control member for the energy feedback is configured to acquire a braking depth signal of a brake pedal in real time based on the back-and-forth movement of the actuating assembly, and control the energy feedback based on the braking depth signal.

18 Claims, 13 Drawing Sheets

(56) References Cited

U.S. PATENT DOCUMENTS

2015/0035349 A1\* 2/2015 Watanabe ................. B60T 7/06
                                                            303/3
2018/0170328 A1\* 6/2018 Yoshizu ................ B60T 8/3255

FOREIGN PATENT DOCUMENTS

| CN | 203844620 U | 9/2014 |
| WO | 2009109249 A1 | 9/2009 |

\* cited by examiner

APPARATUS FOR CONTROLLING ENERGY FEEDBACK, BRAKING SYSTEM AND VEHICLE COMPRISING THE SAME

CROSS REFERENCE TO RELATED APPLICATIONS

The present application is a continuation application of International (PCT) Patent Application No. PCT/CN2016/111334 filed on Dec. 21, 2016, the entire contents of which are hereby incorporated by reference in their entireties.

TECHNICAL FIELD

The present disclosure relates to the technical field of vehicle technologies, and in particular to an apparatus for controlling energy feedback, a braking system comprising the apparatus for controlling energy feedback, and a vehicle comprising the braking system.

BACKGROUND

Energy feedback technology is a core technology of vehicles. In the related art, an angle sensor or a displacement sensor is usually mounted at an outer side of a brake pedal and an accelerator pedal. A driving state of the vehicle may be analyzed based on signals of the brake pedal and the accelerator pedal collected by the sensor and combing with information such as a vehicle speed, a gradient, or the like, and a starting time and an end time of the energy feedback process are in turn acquired. In this way, the energy feedback during the travelling of the vehicle is achieved.

However, in general, the sensor is additionally arranged on the brake pedal or the accelerator pedal in addition to an original brake device, which changes an original layout of the pedal of the vehicle, and has a safety hazard and a poor reliability. In addition, other auxiliary components (for example, a stroke simulator, a switching device for the stroke simulator, a sliding groove of an actuating lever configured to trigger an operation of the switching device, or the like) are needed in addition to the above-mentioned sensors, in order to complete the controlling of energy feedback. Therefore, the energy feedback apparatus in the related art has a complicated structure and is inconvenient to install. In this way, the manufacturing of the entire vehicle is more complicated, and the manufacturing cost is high.

SUMMARY

In one aspect, an apparatus for controlling energy feedback is provided. The apparatus includes a housing, an actuating assembly, a first control member for a stop lamp, and a second control member for energy feedback. The actuating assembly is received in the housing and movable back and forth between a first position and a second position along an axial direction of the housing. The first control member for a stop lamp is received in the housing and configured to trigger the stop lamp to be turned on or off along with a back-and-forth movement of the actuating assembly. The second control member for energy feedback is at least partially received in the housing. The second control member for the energy feedback is configured to acquire a braking depth signal of a brake pedal in real time based on the back-and-forth movement of the actuating assembly, and control the energy feedback based on the braking depth signal.

In another aspect, a braking system is further provided. The braking system includes a brake pedal, a bracket, the apparatus for controlling energy feedback as previously described, and a bump. The brake pedal includes a pedal body and a pedal arm connected to the pedal body. A gap is defined by the bracket and the pedal arm. The apparatus for controlling energy feedback is connected to the bracket. The bump is disposed on the brake pedal, received in the gap defined by the pedal arm and the bracket, and configured to press or separate from the apparatus for controlling energy feedback.

In a further aspect, a vehicle is provided. The vehicle includes a battery and the braking system as previously described. The braking system is electrically connected to the battery.

BRIEF DESCRIPTION OF THE DRAWINGS

The present disclosure will be further described below with reference to the accompanying drawings and embodiments.

DETAILED DESCRIPTION

Figure 1:
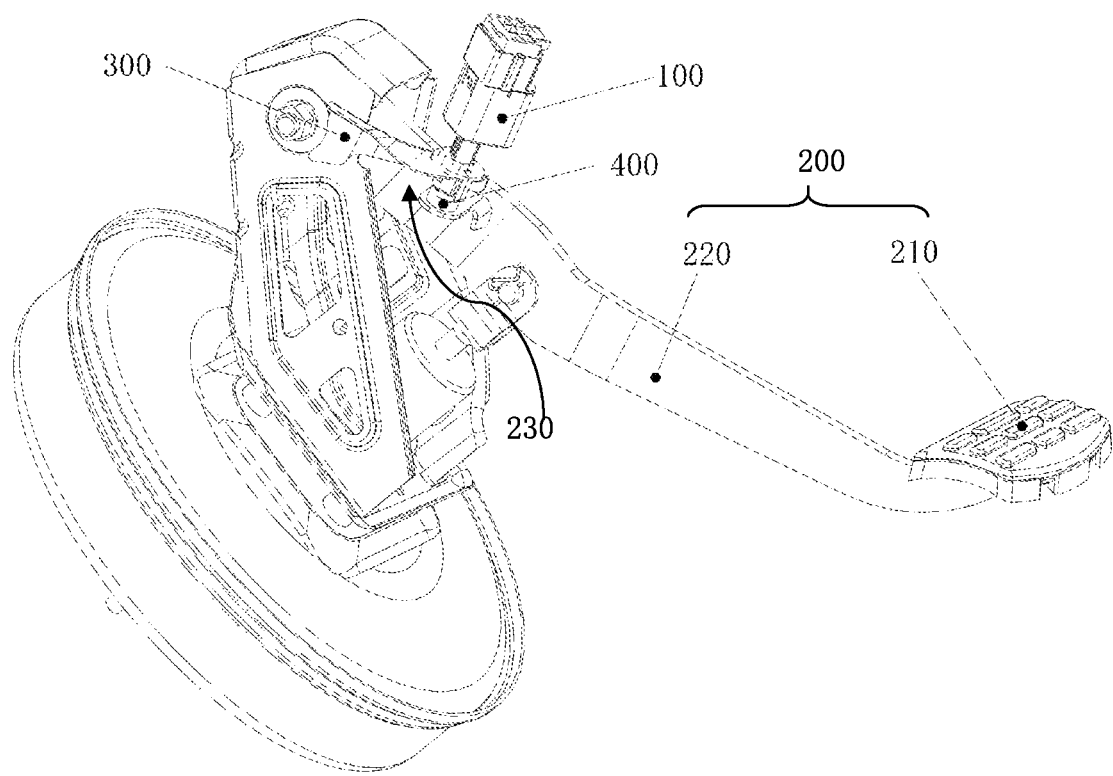
FIG. 1 is a perspective view of a braking system according to some embodiments of the present disclosure.

In order to make the objective, the technical solution, and the advantages of the present disclosure more clearly, the present disclosure will be further described in detail below with reference to the accompanying drawings and embodiments. It should be understood that the embodiments described herein are merely for illustration, and are not for limitation.

In the present disclosure, it should be noted that, unless specified or limited, otherwise, terms "mounted", "connected", "connected", and the like may be used in a broad sense, and may include, for example, fixed connections, detachable connections, or integral connections; may also be mechanical, electrical connections, or communications; may also be direct connections or indirect connections via intervening structures; may also be inner communications of two elements, as can be understood by one skilled in the art depending on specific contexts.

In addition, terms such as "first", "second", and the like, are used herein for purposes of description, and are not intended to indicate or imply relative importance or significance or to imply the number of indicated technical features. Thus, the feature defined with "first", "second", and the like may include one or more of such a feature.

Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . . " does not exclude the presence of additional identical elements in the process, method, article or device that includes the element.

In one aspect, an apparatus for controlling energy feedback is provided. The apparatus includes a housing, an actuating assembly, a first control member for a stop lamp, and a second control member for energy feedback. The actuating assembly is received in the housing and movable back and forth between a first position and a second position along an axial direction of the housing. The first control member for a stop lamp is received in the housing and configured to trigger the stop lamp to be turned on or off along with a back-and-forth movement of the actuating assembly. The second control member for energy feedback is at least partially received in the housing. The second control member for the energy feedback is configured to acquire a braking depth signal of a brake pedal in real time based on the back-and-forth movement of the actuating assembly, and control the energy feedback based on the braking depth signal.

In some embodiments, the second control member for the energy feedback comprises a magnetic field generating portion, a Hall sensor, and a controller. The magnetic field generating portion is fixed to the actuating assembly, movable synchronously along with the back-and-forth movement of the actuating assembly, and configured to generate a magnetic field. The Hall sensor is fixed on one side of an inner wall of the housing that is adjacent to the magnetic field generating portion, and configured to detect a change in strength of the magnetic field around the Hall sensor and output a real-time voltage signal. The controller is electrically connected to the Hall sensor and a motor, and configured to convert the real-time voltage signal into the braking depth signal and control the energy feedback in real time based on the braking depth signal.

In some embodiments, the magnetic field generating portion comprises a first magnet and a second magnet spaced apart from each other; the first magnet and the second magnet are successively disposed in a direction from the second position toward the first position along the axial direction of the housing. When the actuating assembly is at the first position, a center of the first magnet is aligned with a center of the Hall sensor; while the actuating assembly is at the second position, a center of the second magnet is aligned with the center of the Hall sensor.

In some embodiments, the apparatus further comprises a holder sleeved on a periphery of the actuating lever. A receiving hole configured to receive the magnetic field generating portion is defined in the holder.

In some embodiments, the second control member for the energy feedback comprises a movable portion, a laser sensor, and a controller. The movable portion is fixed to the actuating assembly and movable synchronously with the back-and-forth movement of the actuating assembly. The laser sensor is fixed on an inner wall of the housing, and configured to detect and output a real-time distance signal of the movable portion; wherein the real-time distance signal is configured to indicate a real-time distance between the movable portion and the laser sensor. The controller is electrically connected to the laser sensor and a motor, and configured to convert the real-time distance signal into the braking depth signal and control the energy feedback based on the braking depth signal.

In some embodiments, the actuating assembly comprises an actuating lever received in the housing, a first elastic member, and a second elastic member. The first elastic member is expandable and compressible along the axial direction of the housing. One end of the first elastic member abuts against the housing, and the other end of the first elastic member abuts against the actuating lever. The second elastic member is expandable and compressible along the axial direction of the housing. The second elastic member is sleeved on the first elastic member; one end of the second elastic member abuts against the housing; the other end of the second elastic member abuts against the actuating lever in a condition that the actuating lever is at the first position, and moves to a position at which the stop lamp is turned on by the first control member for the stop lamp in a condition that the actuating lever is at the second position; a length of the second elastic member is less than a length of the first elastic member.

In some embodiments, the first control member for the stop lamp comprises a first stationary contact, a first movable contact, and a normally open signal terminal. The first stationary contact is fixed in the housing. The first movable contact is fixed on the second elastic member. The first movable contact is movable back and forth along with an expansion and compression of the second elastic member, such that the first movable contact is capable of being in contact with or separated from the first stationary contact. The normally open signal terminal is electrically connected to the first stationary contact.

In some embodiments, the first control member for the stop lamp further comprises a second stationary contact, a second movable contact, and a normally closed signal terminal. The second stationary contact is fixed in the housing. The second movable contact is fixed on the actuating assembly. The second movable contact is slidable back and forth along the second stationary along with the back-and-forth movement of the actuating assembly. The normally closed signal terminal is electrically connected to the second stationary contact.

In some embodiments, the housing comprises a base and a cover. The base comprises a first shell, a second shell, and a connecting plate. The first shell is opened at one end. The second shell is connected to the first shell. The connecting plate is connected between the first shell and the second shell, and configured to separate the first shell from the second shell; wherein the first elastic member and the second elastic member are respectively fixedly connected to the connecting plate. The cover is disposed on the base. The base and the cover cooperatively define a receiving space; the actuating assembly, the first control member for the stop lamp and the second control member for the energy feedback are received in the receiving space.

In some embodiments, the cover comprises a cover body and a hollow guide portion. The cover body is disposed on the first shell and abuts against the connecting plate. The hollow guide portion extends from the cover body in a direction away from the connecting plate. The actuating lever is at least partially disposed in the guide portion.

In some embodiments, the housing further comprises a first guide post and a second guide post extending from the connecting plate in a direction toward the actuating assembly; the second guide post is sleeved on an outer side of the first guide post; a length of the second guide post is less than a length of the first guide post. The first elastic member is located between the first guide post and the second guide post, while the second elastic member is sleeved on the second guide post.

In another aspect, a braking system is further provided. The braking system includes a brake pedal, a bracket, the apparatus for controlling energy feedback as previously described, and a bump. The brake pedal includes a pedal body and a pedal arm connected to the pedal body. A gap is defined by the bracket and the pedal arm. The apparatus for controlling energy feedback is connected to the bracket. The bump is disposed on the brake pedal, received in the gap defined by the pedal arm and the bracket, and configured to press or separate from the apparatus for controlling energy feedback.

In a further aspect, a vehicle is provided. The vehicle includes a battery and the braking system as previously described. The braking system is electrically connected to the battery.

The present disclosure relates to a vehicle driven or towed by a power unit. The vehicle may be an electric vehicle or a hybrid vehicle. In some embodiments, the vehicle may include a battery and a braking system electrically connected to the battery and powered by the battery.

Figure 14:
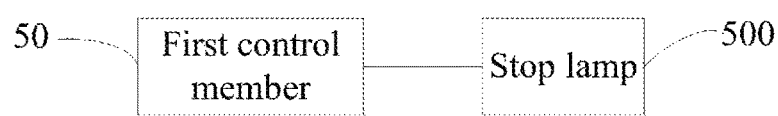
FIG. 14 is a block diagram showing the control member for a stop lamp and the stop lamp according to some embodiments of the present disclosure.

FIG. 1 illustrates a braking system according to some embodiments of the present disclosure. As shown in FIG. 1, the braking system may substantially include an apparatus 100 for controlling energy feedback, a brake pedal 200, and a bracket 300. In some embodiments, the brake pedal 200 may include a pedal body 210 and a pedal arm 220 connected to the pedal body 210. A driver may press down or step on the pedal body 210. The apparatus 100 may be connected to the bracket 300, and a gap 230 may be defined between the pedal arm 220 of the brake pedal 200 and the bracket 300. That is, the bracket 300 may not contact with or may be free from contacting with the pedal arm 220. In some embodiments, the apparatus 100 may be fixed on the bracket 300. A bump 400 may be further disposed on the brake pedal 200. The bump 400 may be located or received in the gap 230 between the pedal arm 220 and the bracket 300. When the brake pedal 200 is pressed down or released, the bump 400 may be closely pressed on the apparatus 100 or separated from the apparatus 100 along with the movement of the brake pedal 200, respectively. In this way, the apparatus 100 may be triggered to turn on or off a stop lamp 500 (shown in FIG. 14), and meanwhile a control to the energy feedback may be achieved in real time.

Figure 2:
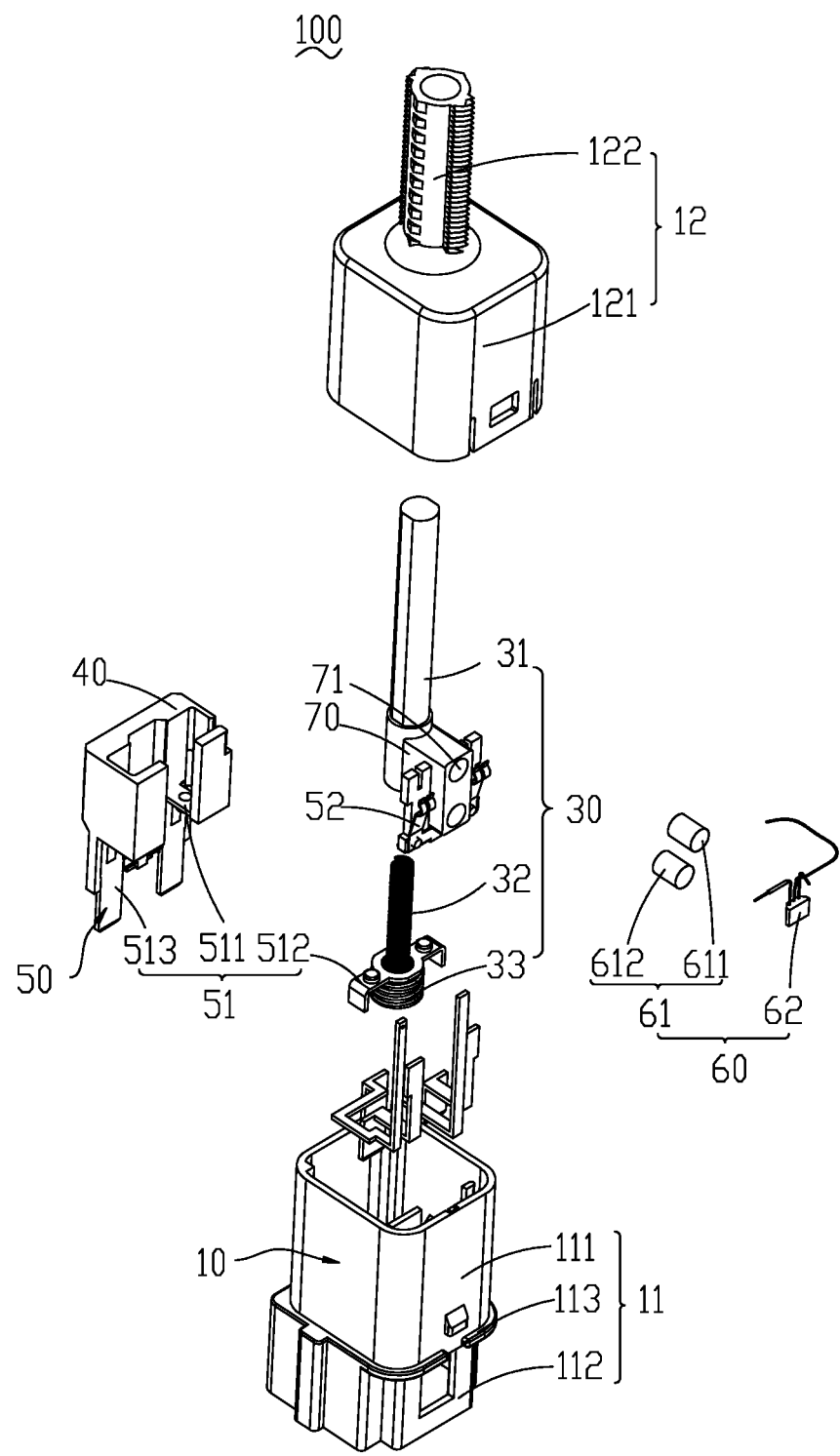
FIG. 2 is an exploded view of an apparatus for controlling energy feedback according to some embodiments of the present disclosure.

FIG. 2-9 may substantially illustrate the apparatus 100 for controlling energy feedback according to some embodiments of the present disclosure. As shown in FIG. 2, the apparatus 100 may substantially include a housing 10, an actuating assembly 30, a first control member 50 for a stop lamp 500, and a control member 60 for energy feedback. The actuating assembly 30, the first control member 50 for the stop lamp 500, and the second control member 60 for energy feedback may all be received in the housing 10. As further shown in FIGS. 8 and 9, the actuating assembly 30 may be movable in the housing 10 along an axial direction X of the housing 10 along with the movement of the brake pedal 200. Besides, the actuating assembly 30 may be movable back and forth or reciprocated between a first position A1 shown in FIG. 8 and a second position A2 shown in FIG. 9. In some embodiments, the first position A1 may be a position at which one end of the actuating assembly 30 that is adjacent to the bump 400 is located in the condition that the brake pedal 200 is not pressed down. The second position A2 may be a position at which one end of the actuating assembly 30 that is adjacent to the bump 400 is located in the condition that the brake pedal 200 is pressed to its maximum position or farthest position. Therefore, a distance between the first position A1 and the second position A2 may be a maximum stroke L of the actuating assembly 30. The first control member 50 for the stop lamp 500 may be configured to control the stop lamp 500 to be turned on or off based on the back-and-forth movement (also called as "reciprocating movement") of the actuating assembly 30. In some embodiments, the second control member 60 for the energy feedback may be at least partially received in a receiving space 13 of the housing, and configured to acquire a braking depth signal of the brake pedal 200 in real time based on the back-and-forth movement of the actuating assembly 30. The second control member 60 may be further configured to control, based on the braking depth signal, a magnitude of an output torque of a motor 600 (shown in FIG. 15) and the cooperation between the hydraulic braking and the motor braking in real time. In this way, it is possible to control a ratio of the baking to energy recovery of the vehicle.

Figure 5:
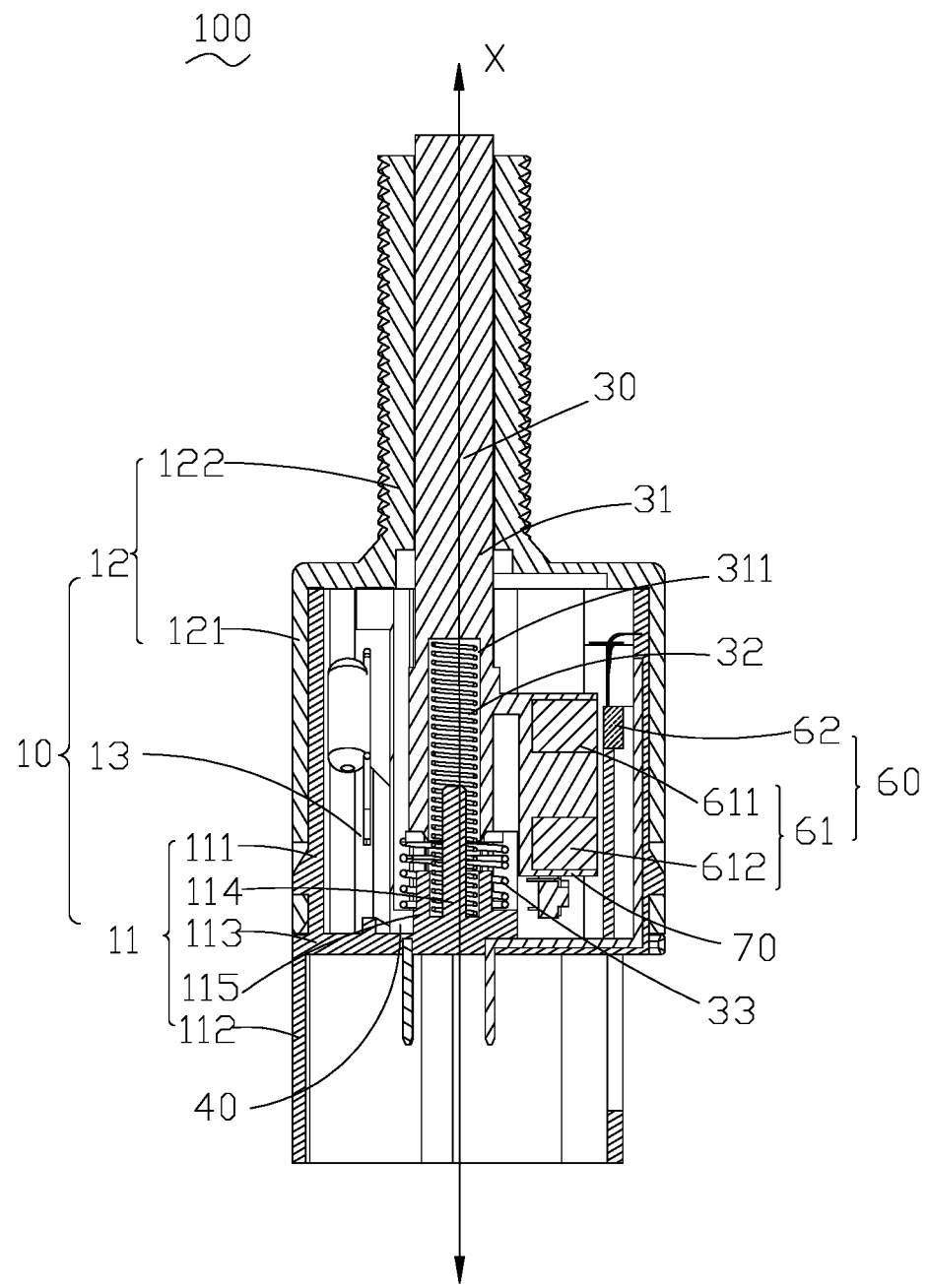
FIG. 5 is a cross-sectional view of the apparatus for controlling energy feedback taken along line A-A shown in FIG. 4.

In some embodiments, as shown in FIG. 2 and FIG. 5, the housing 10 may substantially include a base 11 and a cover 12. The cover 12 may be disposed on the base 11 and cover the base 11. The cover 12 and the base 11 may cooperatively enclose, define, or surround a receiving space 13. In some embodiments, the base 11 may substantially include a first shell 111 opened at one end, a second shell 112 connected to the first shell 111, and a connecting plate 113. The connecting plate 113 may be connected between the first shell 111 and second shell 112, and configured to separate the first shell 111 from second shell 112. Of course, in other embodiments, the connecting plate 113 may be implemented as any other suitable metal or non-metal plate. In some embodiments, the first shell 111, the second shell 112, and the connecting plate 113 may also be made of the same material and integrally formed into one part. As further shown in FIGS. 2 and 5, the housing 10 may further include a first guide post 114 and a second guide post 115, and the first guide post 114 and the second guide post 115 may be disposed or formed on the connecting plate 113. The first guide post 114 and the second guide post 115 may extend from the connecting plate 113 in a direction toward the actuating assembly 30. The second guide post 115 may be hollow, and sleeved on an outer side of the first guide post 114; that is to say, the second guide post 115 may surround the first guide post 114. Besides, a receiving gap may be defined between the second guide post 115 and the first guide post 114. In some embodiments, a length of the second guide post 115 may be less than a length of the first guide post 114.

The cover 12 may substantially include a cover body 121 and a guide portion 122 for an actuating lever 31. The cover body 121 may be disposed on the first shell 111, cover the first shell 111, and further abut against the connecting plate 113. In some embodiments, as shown in FIG. 5, the first shell 111 may be received in the cover body 121, and further abut against the cover body 121. The guide portion 122 may be hollow, and extend from the cover body 121 in a direction away from or opposite to the connecting plate 113.

As shown in FIGS. 2 and 5, the actuating assembly 30 may substantially include an actuating lever 31 (also called as actuating rod), a first elastic member 32, and a second elastic member 33. The actuating lever 31 may be received in the receiving space 13. The first elastic member 32 and the second elastic member 33 may be expandable and compressible, and may extend along the axial direction X of the housing 10. The actuating lever 31 may be at least partially disposed in the guide portion 122, one end of the actuating lever 31 that is away from the connecting plate 113 may extend out of the guide portion 122. The actuating lever 31 may be movable back and forth along the axial direction X of the housing 10 under elastic forces generated by the first elastic member 32 and the second elastic member 33.

In some embodiments, one end of the first elastic member 32 may abut against the connecting plate 113, and the other end of the first elastic member 32 may abut against the actuating lever 31. In this way, the actuating lever 31 may be movable back and forth in the guide portion 122 along the axial direction X of the housing 10 due to the expansion and compression of the first elastic member 32. In some embodiments, a receiving hole 311 configured to receive the first elastic member 32 may be defined at one end of the actuating lever 31 that faces toward or adjacent to the connecting plate 113. One end of the first elastic member 32 may be sleeved on the first guide post 114 and located between the second guide post 115 and the first guide post 114. More specifically, the first elastic member 32 may be received in the receiving gap defined between the second guide post 115 and the first guide post 114. The other end of the first elastic member 32 may be at least partially received in the receiving hole 311 and abut against an inner wall in the receiving hole 311. The first elastic member 32 may be guided by the receiving hole 311 and the first guide post 114.

The second elastic member 33 may be sleeved on an outer side of the first elastic member 32. One end of the second elastic member 33 may abut against the connecting plate 113. The other end of the second elastic member 33 may be a free end, and may freely move when the actuating lever 31 is moving back and forth. More specifically, in some embodiments, the second elastic member 33 may be sleeved on an outer side of the second guide post 115, and thus the second elastic member 33 may be guided by the second guide post 115. When the actuating lever 31 is located at the first position A1 shown in FIG. 8 (that is, when the brake pedal 200 is not pressed down), the other end of the second elastic member 33 may abut against the actuating lever 31. However, when the actuating lever 31 is located at the second position A2 shown in FIG. 9 (that is, when the brake pedal 200 is pressed down to the maximum position), the other end of the second elastic member 33 may move to a position at which the first control member 50 may control the stop lamp 500 to be turned on. In some embodiments, a length of the second elastic member 33 may be less than a length of the first elastic member 32.

In some embodiments, the first elastic member 32 and the second elastic member 33 may be compression springs or rubber members.

As further shown in FIGS. 2 and 5, the apparatus 100 may further include a holder 40 fixed in the receiving space 13. In some embodiments, one end of the holder 40 may abut against the connecting plate 113, and the other end of the holder 40 may abut against an inner wall of the cover body 121 of the cover 12. The holder 40 may be hollow. The actuating assembly 30 may be at least partially disposed in the holder 40, and movable relative to the holder 40. In some embodiments, a gap or a clearance may be defined between the holder 40 and the actuating assembly 30, such that it is possible to prevent the actuating assembly 30 from colliding with the holder 40 during the movement, thereby extending a service life of the actuating assembly 30.

Figure 6:
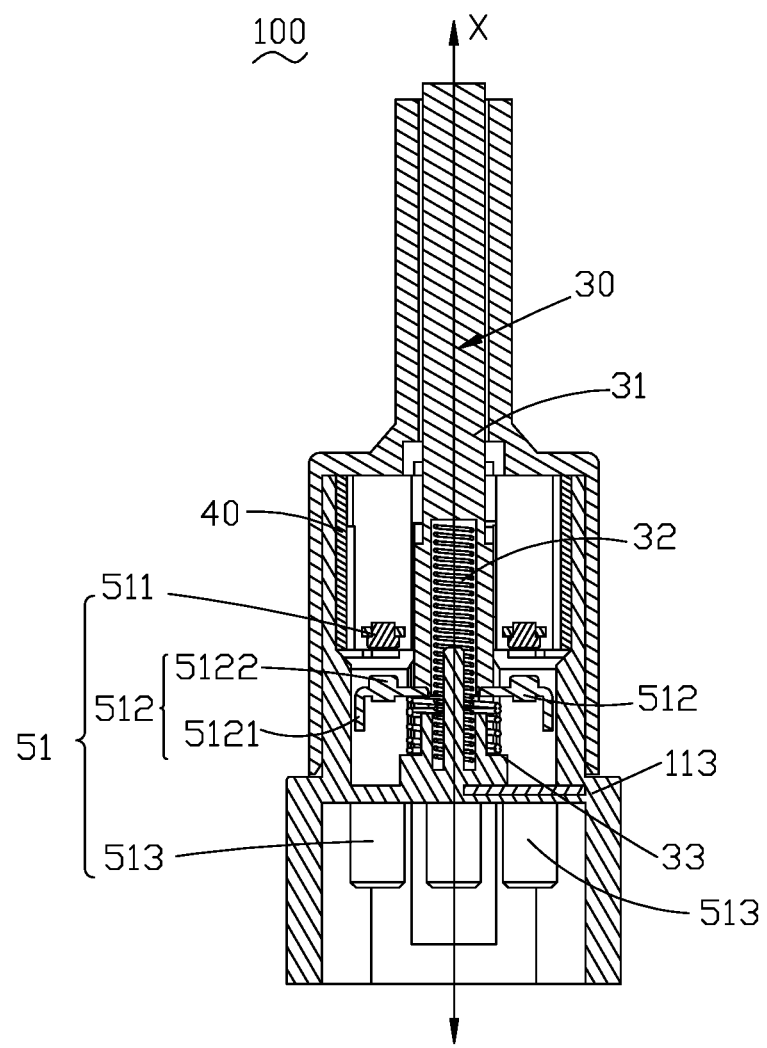
FIG. 6 is a cross-sectional view of the apparatus for controlling energy feedback taken along line B-B shown in FIG. 4.

In some embodiments, as shown in FIGS. 2 and 6, the first control member 50 may substantially include a normally open control assembly 51. The normally open control assembly 51 may substantially include a first stationary contact 511 fixed on the holder 40, a first movable contact 512 fixed on the second elastic member 33, and a normally open signal terminal 513 electrically connected to the first stationary contact 511. The first movable contact 512 may be fixed to one end of the second elastic member 33 that is away from the connecting plate 113. In this way, the first movable contact 512 may be movable back and forth along with the expansion and compression of the second elastic member 33, such that the first movable contact 512 may be in contact with or separated from the first stationary contact 511, and the stop lamp 500 may be triggered to be turned on or off as a result.

In some embodiments, as shown in FIG. 2 and FIG. 6, two first stationary contacts 511 may be provided. More specifically, one first stationary contact 511 may be disposed at one side of the actuating lever 31, and the other first stationary contact 511 may be disposed at an opposite side of the actuating lever 31. Correspondingly, two normally open signal terminals 513 may be disposed. In this way, each first fixed contact 511 may be electrically connected to a corresponding one of the normally open signal terminals 513. The first movable contact 512 may include a fixing portion 5121 and two movable contact portions 5122. The fixing portion 5121 may be sleeved on the second elastic member 33 at one end of the second elastic member 33 that is away from the connecting plate 113. The two movable contact portions 5122 may be respectively fixed at two opposite ends of the fixing portion 5121 and disposed correspondingly to the two first stationary contacts 511. In this way, each movable contact portion 5122 may be in contact with or separated from the corresponding first stationary contact 511 during the back-and-forth movement of the second elastic member 33.

Of course, in other embodiments, one first stationary contact or three or more first stationary contacts may also be provided as required. The number of the first movable contacts and the number of the normally open signal terminals may be correspondingly set.

Figure 3:
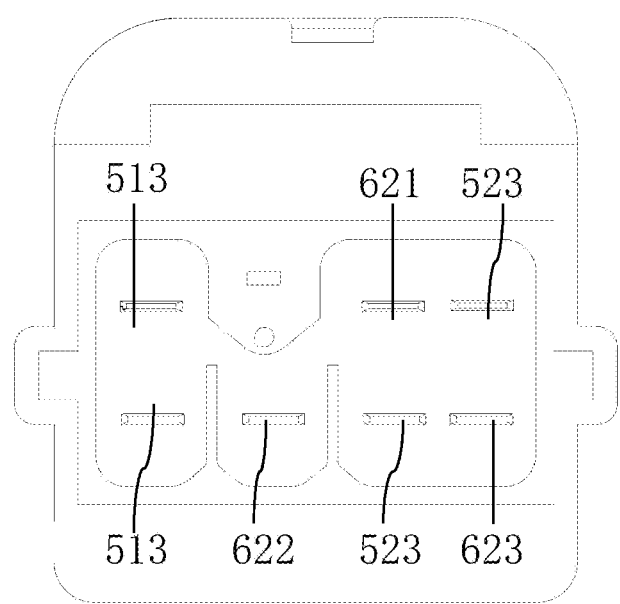
FIG. 3 is a bottom view of the apparatus for controlling energy feedback shown in FIG. 2.
Figure 4:
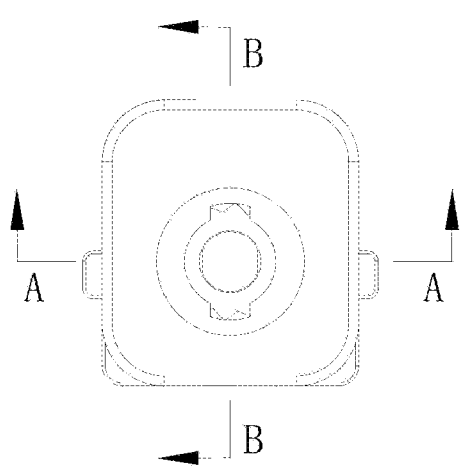
FIG. 4 is a top view of the apparatus for controlling energy feedback shown in FIG. 2.
Figure 7:
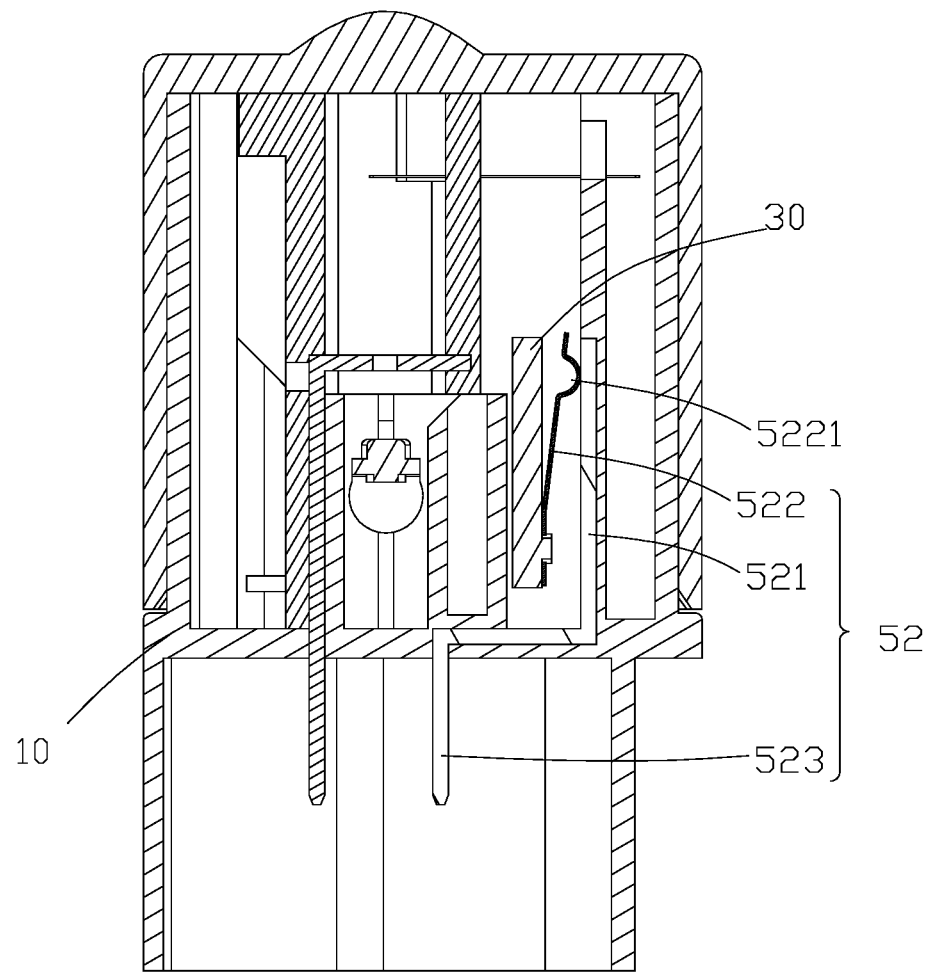
FIG. 7 is a view illustrating the structure of a normally closed control assembly of the apparatus for controlling energy feedback.
Figure 8:
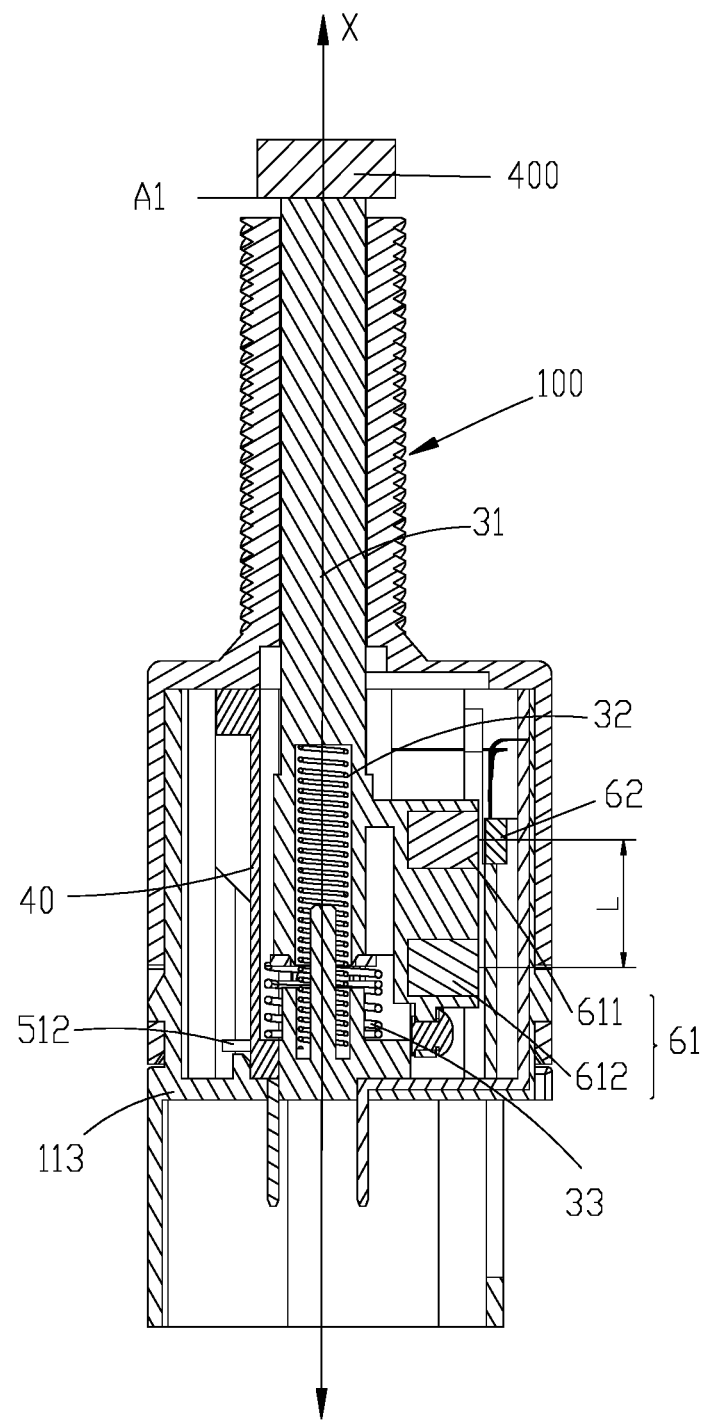
FIG. 8 is a view illustrating the positional relationship between a bump and the apparatus for controlling energy feedback shown in FIG. 1 in a condition that a brake pedal is not pressed down.

As further shown in FIGS. 2 and 7, the first control member 50 may further include a normally closed control assembly 52. The normally closed control assembly 52 may be configured to control the stop lamp 500 to be turned on and off when the normally open control assembly 51 fails. As shown in FIG. 3 and FIG. 8, in some embodiments, the normally closed control assembly 52 may substantially include a second stationary contact 521 fixed on the base 11, a second movable contact 522 fixed on the actuating assembly 30, and a normally closed signal terminal 523 electrically connected to the second stationary contact 521 (combing with FIG. 3 together). In some embodiments, the second movable contact 522 may include a contact portion 5221. The contact portion 5221 may be in shape of an arc, and in contact with the second stationary contact 521. During the back-and-forth movement of the actuating assembly 30, the second movable contact 522 may be slidable back and forth along the second stationary contact 521 via the contact portion 5221. That is to say, the contact portion 5221 may be slidable back and forth along the second stationary contact 521. In some embodiments, two second stationary contacts 521, two second movable contacts 522, and two normally closed signal terminals 523 may be provided. Of course, in other embodiments, it is also possible to provide one stationary contact, or provide three or more second stationary contacts as required. The number of the second movable contacts and the number of the normally closed signal terminals may be correspondingly set.

When the pedal body 210 is not pressed down, the second movable contact 522 may be kept in contact with the second stationary contact 521. When the pedal body 210 is pressed down, during the normal operation, a circuit between the normally open signal terminal 513 and an external circuit may be switched on (that is, the normally open signal terminal 513 is electrically connected to an external circuit), and a circuit between the normally closed signal terminal 523 and the external circuit may be switched off (that is, the normally closed signal terminal 523 is disconnected from the external circuit). In this way, the normally open signal terminal 513 may control the stop lamp 500 to be turned on and off. However, when the normally open signal terminal 513 fails, the circuit between the normally open signal terminal 513 and the external circuit may be switched off (that is, the normally open signal terminal 513 is disconnected from the external circuit), and the circuit between the normally closed signal terminal 523 and the external circuit may be switched on (that is, the normally closed signal terminal 523 is electrically connected to the external circuit). Since the second movable contact 522 of the normally closed control unit 52 is kept in contact with the second stationary contact 521, the stop lamp 500 may be turned on when the circuit between the normally closed terminal signal 523 and the external circuit is switched on. However, when the circuit between the normally closed terminal signal 523 and the external circuit is switched off, the stop lamp 500 may be turned off.

Figure 15:
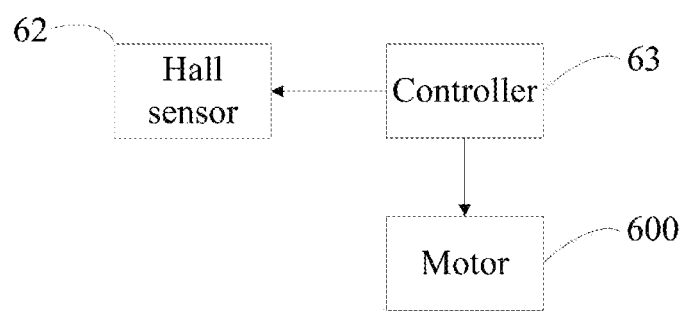
FIG. 15 is a block diagram showing the controller, the Hall sensor, and the motor according to some embodiments of the present disclosure.

As further shown in FIGS. 2, 5 and 15, in some embodiments, the second control member 60 for energy feedback may substantially include a magnetic field generating portion 61, a Hall sensor 62, and a controller 63. In some embodiments, the magnetic field generating portion 61 may be fixed to the actuating assembly 30, and may synchronously or simultaneously move with the back-and-forth movement of the actuating assembly 3. The magnetic field generating portion 61 may be configured to generate a magnetic field. The Hall sensor 62 may be fixed to one side of an inner wall of the first shell 111 that is adjacent to the magnetic field generating portion 61. The Hall sensor 62 may be configured to detect a change in strength of the magnetic field around the Hall sensor 62 in real time, and output a real-time voltage signal. In this way, it is possible to detect the braking depth in real time by the arrangement of the Hall sensor 62. The controller 63 may be disposed in the housing 10 or disposed outside the housing 10. The controller 63 may be electrically connected to the Hall sensor 62 and the motor 600 of the entire vehicle, and configured to convert the real-time voltage signal into the braking depth signal, and control an energy feedback process in real time based on the brake depth signal.

As shown in FIG. 3, the Hall sensor 62 may include an analog signal output terminal 621, a power input terminal 622, and a ground terminal 623.

As shown in FIGS. 2 and 5, in some embodiments, the apparatus 100 may further include a holder 70. The holder 70 may be fixedly connected to the actuating assembly 30. In some embodiments, the holder 70 may be sleeved on a periphery of the actuating lever 31, and engaged with the actuating lever 31 in an interference fit. In some embodiments, the holder 70 may define a receiving hole 71 configured to position and receive the magnetic field generating portion 61. The magnetic field generating portion 61 may be mounted, received, or disposed in the receiving hole 71 of the holder 70. In this way, when the actuating assembly 30 is moving back and forth along the axial direction X of the housing 10, the actuating assembly 30 may drive or carry the holder 70 and the magnetic field generating portion 61 to move back and forth.

Figure 9:
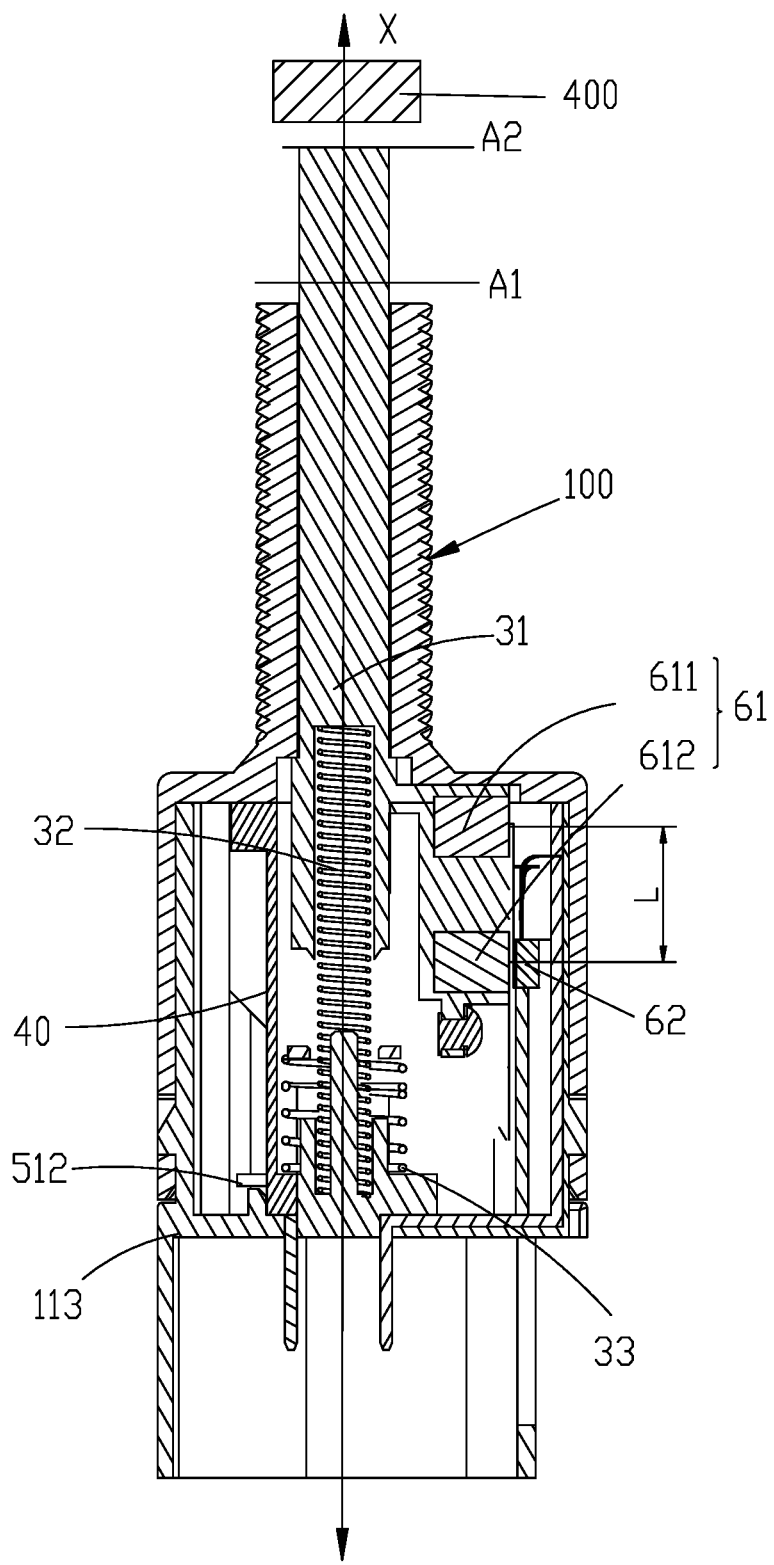
FIG. 9 is a view illustrating the positional relationship between the bump and the apparatus for controlling energy feedback shown in FIG. 1 in a condition that the brake pedal is pressed down to separate the bump from the apparatus for controlling energy feedback.

In some embodiments, the magnetic field generating portion 61 may be a magnet. As shown in FIGS. 8 and 9, the magnetic field generating portion 61 may include a first magnet 611 and a second magnet 612 spaced apart from each other. The first magnet 611 and the second magnet 612 may be successively disposed in a direction from the second position A2 toward the first position A1 along the axial direction X of the housing 10. That is, in some embodiments, the second magnet 612 may be closer to the connecting plate 113 than the first magnet 611, which means a distance between the second magnet 612 and the connecting plate 113 is less than a distance between the first magnet 611 and the connecting plate 113. As shown in FIG. 8, when the actuating assembly 30 is at the first position A1, a center of the first magnet 611 may be disposed correspondingly to and aligned with a center of the Hall sensor 62. When the actuating assembly 30 is at the second position A2, as shown in FIG. 9, a center of the second magnet 612 may be disposed correspondingly to and aligned with the center of the Hall sensor 62. In some embodiments, a distance between the center of the first magnet 611 and the center of the second magnet 612 is the maximum stroke L of the actuating assembly 30.

In some embodiments, the magnetic field generating portion 61 may be a permanent magnet or an electromagnet.

The operation of the apparatus 100 for controlling energy feedback of the present disclosure will be briefly described below with reference to FIGS. 1 and 8-9.

When the pedal body 210 is not pressed down, as shown in FIG. 8, after the apparatus 100 is mounted or installed on the brake pedal 200, the bump 400 may closely press the actuating lever 31 of the actuating assembly 30. At this time, the first elastic member 32 and the second elastic member 33 are both compressed, the actuating lever 31 is at the first position A1, and the first movable contact 512 fixed on the second elastic member 33 abuts against the actuating lever 31. In this way, the first stationary contact 511 may be separated from the first movable contact 512 (the relative position of the first stationary contact 511 relative to the second stationary contact 512 in this case may be referred to FIG. 6), and the stop lamp 500 may be turned off. At the same time, the center of the first magnet 611 may be aligned with the center of the Hall sensor 62, and the output voltage outputted by the Hall sensor 62 may reach a first voltage value.

When the driver begins to press down the pedal body 210 of the brake pedal 200, a pressure applied to the actuating lever 31 by the bump 400 disposed on the pedal arm 220 may be gradually reduced, such that the first elastic member 32 and the second elastic member 33 may be gradually reset/returned/restored under the action of the elastic force. At this time, the first elastic member 32 may drive the actuating lever 31 to move from the first position A1 toward the second position A2 in the direction away from the connecting plate 113 along the axial direction X of the housing 10. The second elastic member 33 may drive the first movable contact 512 fixed thereon to move in a same direction as the actuating lever 31, such that the first movable contact 512 may gradually get close to the first stationary contact 511. At the same time, the movement of the actuating lever 31 may drive the magnetic field generating portion 61 to move synchronously, such that the magnetic field strength around the Hall sensor 62 may change, and thus the real-time output voltage outputted by the Hall sensor 62 may also change. In some embodiments, when the bump 400 is gradually separated from the actuating lever 31, the output voltage outputted by the Hall sensor 62 may be gradually increased.

When the pedal body 210 of the brake pedal 200 is pressed down to separate the bump 400 from the apparatus 100, as shown in FIG. 9, the bump 400 may be completely separated from the actuating lever 31. At this time, no external force may be applied to the actuating lever 31, such that the first elastic member 32 may be reset or restored, and thus the actuating lever 30 may reach the second position A2 when being driven by the first elastic member 32. The second elastic member 33 may also be reset or restored, such that the first movable contact 512 fixed on the second elastic member 33 may get into contact with the first stationary contact 511, and thus the stop lamp 500 may be turned on. At the same time, the center of the second magnet 612 may be aligned with the center of the Hall sensor 62, such that the output voltage outputted by the Hall sensor 62 may reach a second voltage value. In some embodiments, the second voltage value may be a maximum value of the output voltage outputted by the Hall sensor 62.

Therefore, during the process of changing a state of the brake pedal 200 from a first state in which the brake pedal 200 is not pressed down by the driver to a second state in which the brake pedal 200 is pressed down with the bump 400 being separated from the apparatus 100, the actuating lever 31 may move from the first position A1 to the second position A2, and the output voltage outputted by the Hall sensor 62 may be increased from the first voltage value to the second voltage value. However, during the releasing of the brake pedal 200 by the driver, the actuating lever 31 may move from the second position A2 to the first position A1, and the output voltage outputted by the Hall sensor 62 may be reduced from the second voltage value to the first voltage value.

After acquiring the output voltage of the Hall sensor, the controller may convert the real-time voltage signal outputted by the Hall sensor into the braking depth of the brake pedal, and combine parameters such as a vehicle speed to acquire a braking force of the vehicle. That is to say, the braking force of the vehicle may be acquired based on the braking depth of the brake pedal and the parameters such as the vehicle speed. After that, the magnitude of the output torque of the control motor may be calculated, and the cooperation between the motor braking and the hydraulic braking may be controlled. In this way, it is possible to reasonably distribute the ratio of the baking to the energy recovery, and in turn effectively control the energy feedback in real time.

Figure 10:
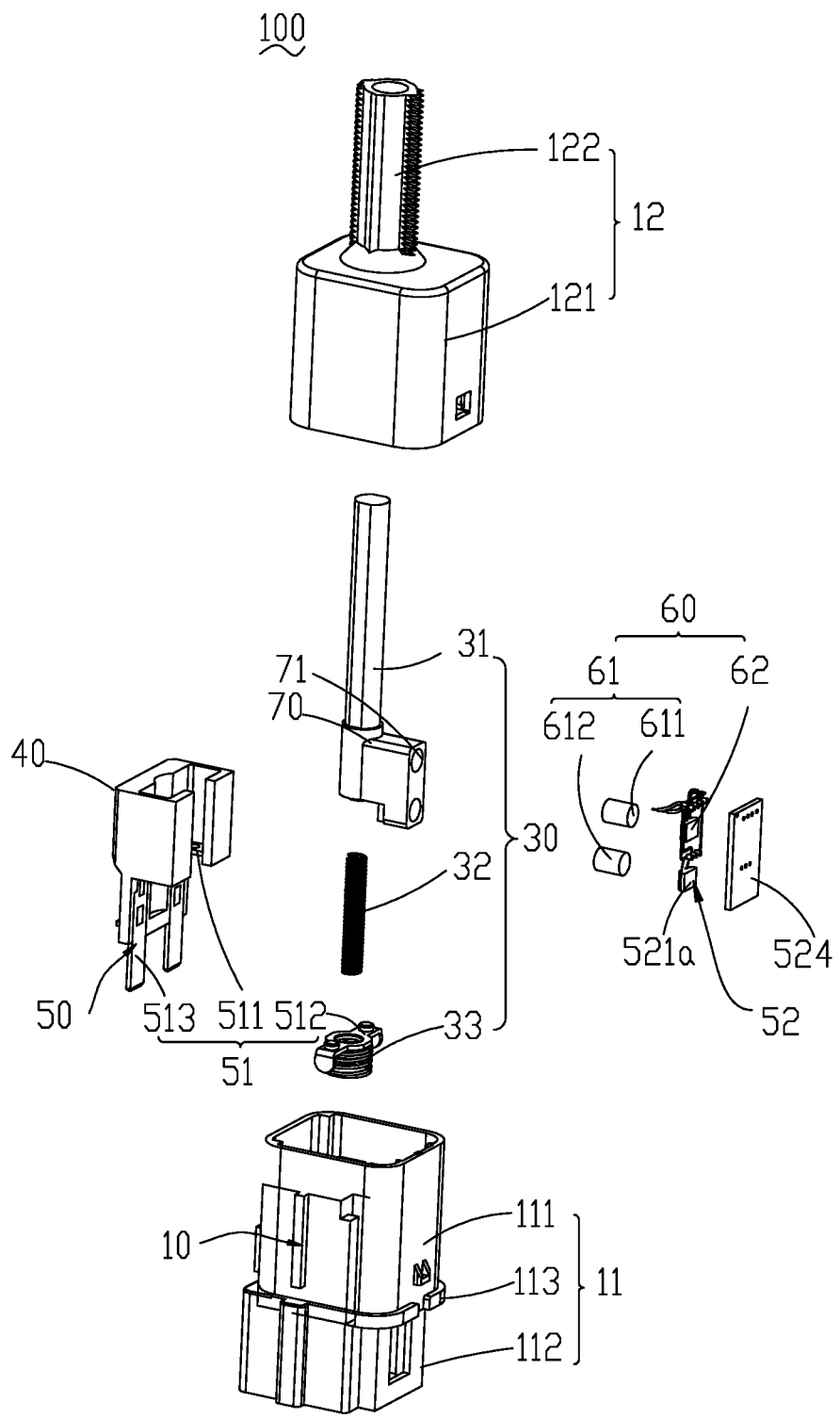
FIG. 10 is another exploded view of an apparatus for controlling energy feedback according to some embodiments of the present disclosure.
Figure 11:
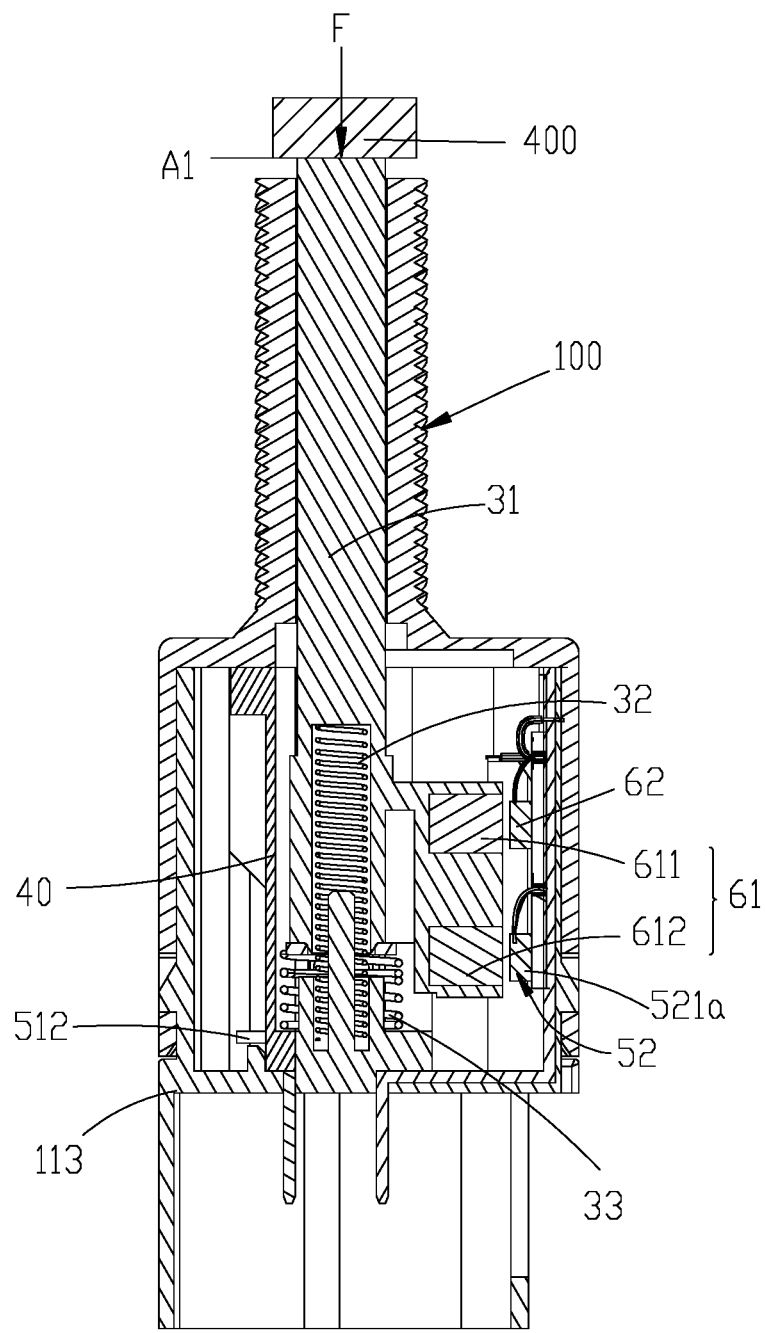
FIG. 11 is a view illustrating the positional relationship between the bump and the apparatus for controlling energy feedback in a condition that a brake pedal is not pressed down.
Figure 12:
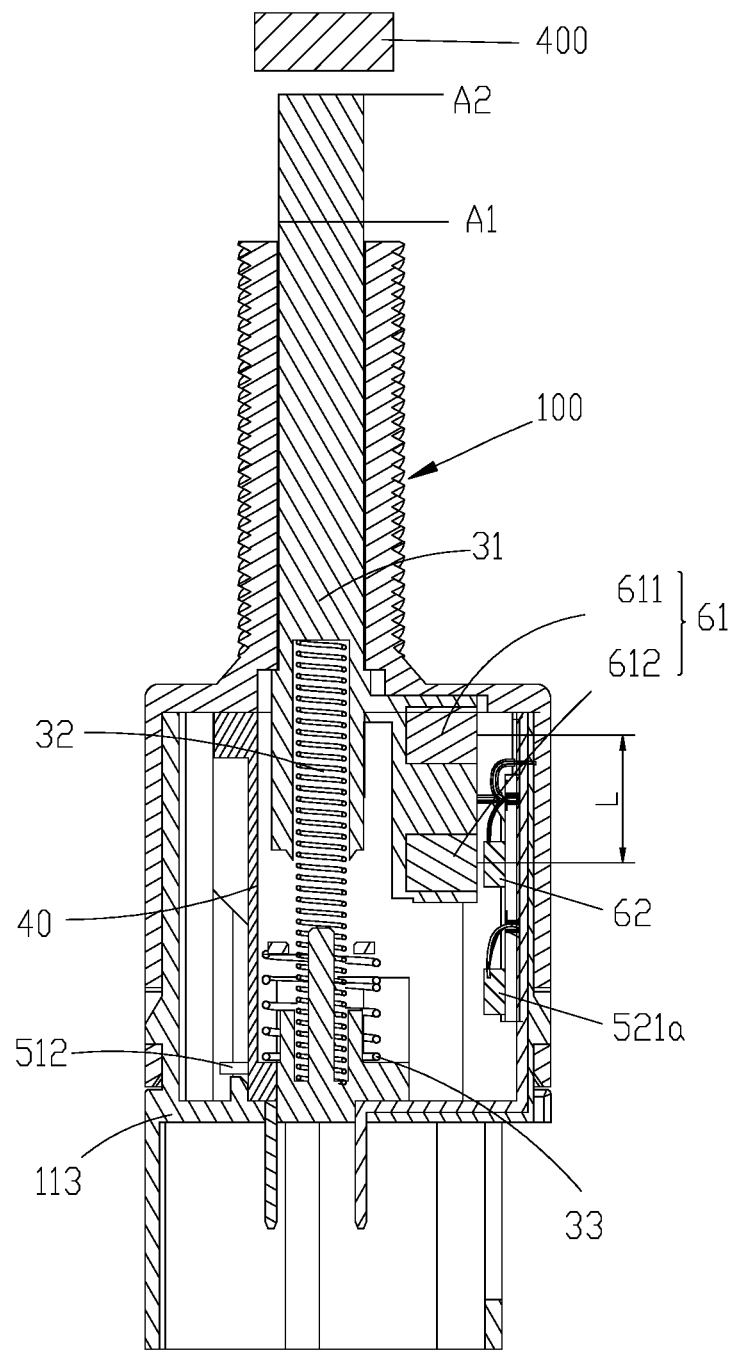
FIG. 12 is a view showing the positional relationship between the bump and the apparatus for controlling energy feedback in a condition that the brake pedal is pressed down to separate the bump from the apparatus for controlling energy feedback.

FIGS. 10-12 illustrate an apparatus 100 for controlling energy feedback according to some embodiments of the present disclosure. The structure of the apparatus 100 shown in FIG. 10 is substantially the same as that of the apparatus 100 shown in FIG. 2, and also includes a housing 10, an actuating assembly 30, a first control member 50 for a stop lamp 500, and a second control member 60 for energy feedback. The details of the same components may not be described any more.

As shown in FIG. 10, in some embodiments, the normally closed control assembly 52 of the first control member 50 for the stop lamp 500 may be of a non-contact type.

More specifically, as shown in FIGS. 10-12, in some embodiments, the normally closed control assembly 52 may substantially include a Hall switch 521a (also called as "Hall-effect switch") fixed to the inner wall of the housing 10. When the pedal body 210 is pressed down or released, the actuating lever 31 may move back and forth and a back-and-forth movement may occur, and the magnetic field generating portion 61 may be driven to move back and forth by the actuating lever 31. In this way, the magnetic field strength around the Hall switch 521a may change, and thus the Hall switch 521a may be switched on or off. After that, the signal indicating the on/off state of the Hall switch 521a may be transmitted to an external system to implement the corresponding function of the normally closed control assembly 52.

As specifically shown in FIGS. 11-12, in some embodiments, the Hall switch 521a and the Hall sensor 62 may be spaced apart from each other along the axial direction X of the housing 10, and are both fixed on a circuit board 524. Besides, the Hall switch 521a may be switched on or off based on the movement of the actuating assembly 30. Furthermore, when the actuating lever 31 is at the first position A1, as shown in FIG. 11, the center of the Hall sensor 62 may be aligned with the center of the first magnet 611. However, when the actuating lever 31 is at the second position A2, as shown in FIG. 12, the center of the Hall sensor 62 may be aligned with the center of the second magnet 612.

In some embodiments, to simplify the structure, the Hall switch 521a and the Hall sensor 62 may be fixed on the same circuit board, and share the power input terminal and the ground terminal. The Hall switch 521a may further include an additional signal output terminal.

When using the Hall switch to replace the normally closed control assembly 52 of a contact type, it is possible to avoid the contact failure caused by the sliding of the second movable contact 522 on the second stationary contact 521 in a long time, and thus the service life of the normally closed control component may be effectively extended.

Figure 13:
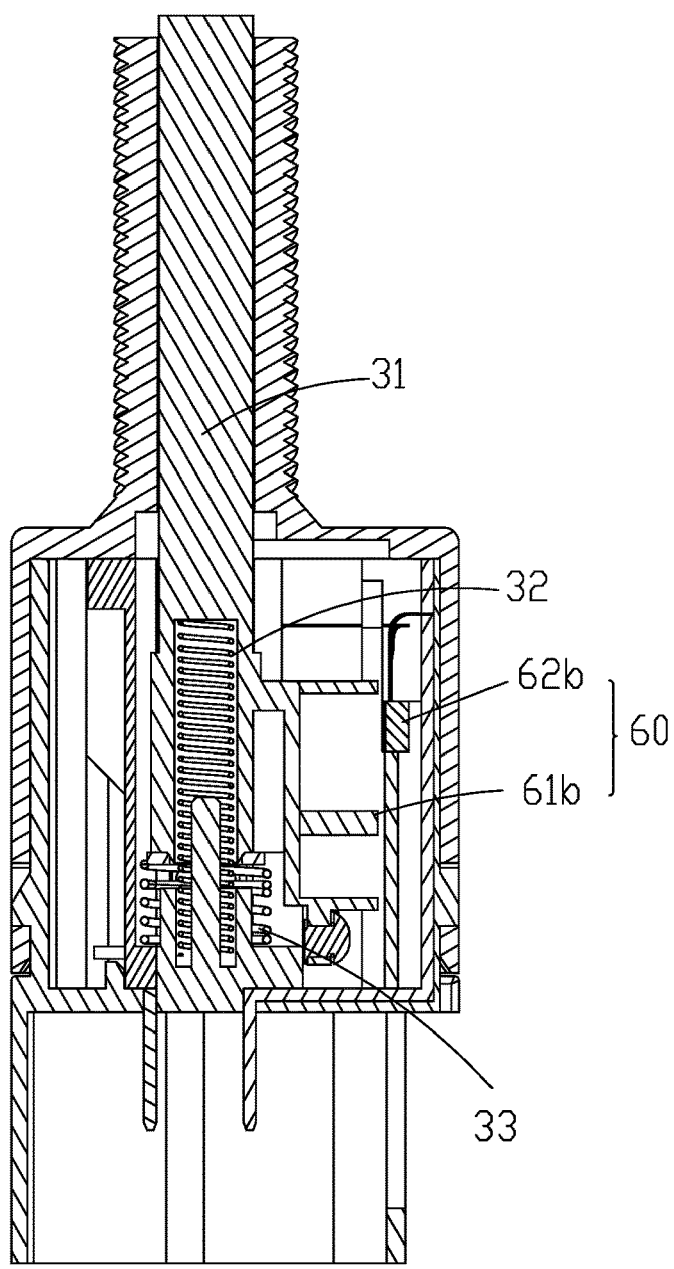
FIG. 13 is another cross-sectional view of the apparatus for controlling energy feedback according to some embodiments of the present disclosure.
Figure 16:
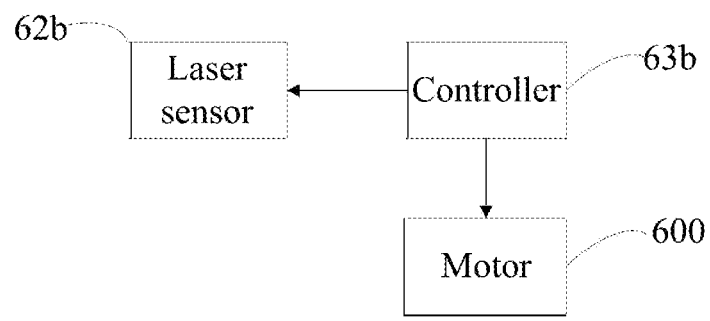
FIG. 16 is a block diagram showing the controller, the laser sensor, and the motor according to some embodiments of the present disclosure.

In the above embodiments, the braking depth of the brake pedal 200 is acquired using the magnetic field generating portion and the Hall sensor. However, according to other embodiments of the present disclosure, as shown in FIGS. 13 and 16, the second control member 60 for the energy feedback may also include a movable portion 61b, a laser sensor 62b, and the controller 63b. In some embodiments, the movable portion 61b may be fixedly disposed on the actuating assembly 30, such that the movable portion 61b may be movable synchronously or simultaneously along with the back-and-forth movement of the actuating assembly 30. The laser sensor 62b may be attached to the inner wall of the housing 10. The laser sensor 62b may be configured to detect and output a real-time distance signal of the movable portion 61b. The real-time distance signal may be configured to indicate a real-time distance between the movable portion 61b and the laser sensor 62b. The controller 63b may be disposed inside or outside the housing 10, and electrically connected to the laser sensor 62b and the motor 600, respectively. The controller 63b may be configured to convert the real-time distance signal into the braking depth signal, and control the energy feedback in real time based on the braking depth signal. In some embodiments, the movable portion 61b may be any protrusion, recess, or grating pattern that extends from the actuating lever 31 of the actuating assembly 30 and that can be sensed or detected by the laser sensor 62b.

When using the apparatus for controlling energy feedback, the braking system and the vehicle of the present disclosure, the apparatus for controlling energy feedback is integrated on the switch of the stop lamp 500, such that the switch of the stop lamp 500 may have the function of turning on and off the stop lamp 500, and also have the function of detecting the pedal depth in real time and meanwhile synchronously controlling the energy feedback in real time. The structure is simple. The installation of the apparatus for controlling energy feedback is also simple and will not change the original layout of the vehicle. Besides, the apparatus has a high control precision, and a reliable safety. Further, the manufacturing cost may be greatly reduced.

The embodiments of the present disclosure are described above with reference to the drawings. However, the present disclosure may not be limited to the embodiments described above. The specific embodiments described above are merely illustrative and not restrictive. Those skilled in the art may make many modifications in the light of the present disclosure, without departing from the spirit and scope of the present disclosure. All these shall be covered within the protection scope of the present disclosure.

What is claimed is:

1. An apparatus for controlling energy feedback, comprising:
   a housing;
   an actuating assembly, received in the housing and movable back and forth between a first position and a second position along an axial direction of the housing;
   a first control member for a stop lamp, received in the housing and configured to trigger the stop lamp to be turned on or off along with a back-and-forth movement of the actuating assembly; and
   a second control member for energy feedback, at least partially received in the housing;
   wherein the second control member for the energy feedback is configured to acquire a braking depth signal of a brake pedal in real time based on the back-and-forth movement of the actuating assembly, and control the energy feedback based on the braking depth signal;
   wherein the actuating assembly comprises:
     an actuating lever, received in the housing;
     a first elastic member, expandable and compressible along the axial direction of the housing; wherein one end of the first elastic member abuts against the housing, and the other end of the first elastic member abuts against the actuating lever; and
     a second elastic member, expandable and compressible along the axial direction of the housing; wherein the second elastic member is sleeved on the first elastic member; one end of the second elastic member abuts against the housing; the other end of the second elastic member abuts against the actuating lever in a condition that the actuating lever is at the first position, and moves to a position at which the stop lamp is turned on by the first control member for the stop lamp in a condition that the actuating lever is at the second position; a length of the second elastic member is less than a length of the first elastic member;
   wherein the first control member for the stop lamp comprises:
     a first stationary contact, fixed in the housing;
     a first movable contact, fixed on the second elastic member; wherein the first movable contact is movable back and forth along with an expansion and compression of the second elastic member, such that the first movable contact is capable of being in contact with or separated from the first stationary contact; and
   a normally open signal terminal, electrically connected to the first stationary contact.

2. The apparatus of claim 1, wherein the second control member for the energy feedback comprises:
   a magnetic field generating portion, fixed to the actuating assembly, movable synchronously along with the back-and-forth movement of the actuating assembly, and configured to generate a magnetic field;
   a Hall sensor, fixed on one side of an inner wall of the housing that is adjacent to the magnetic field generating portion, and configured to detect a change in strength of the magnetic field around the Hall sensor and output a real-time voltage signal; and
   a controller, electrically connected to the Hall sensor and a motor, and configured to convert the real-time voltage signal into the braking depth signal and control the energy feedback in real time based on the braking depth signal.

3. The apparatus of claim 2, wherein the magnetic field generating portion comprises a first magnet and a second magnet spaced apart from each other; the first magnet and the second magnet are successively disposed in a direction from the second position toward the first position along the axial direction of the housing;
   when the actuating assembly is at the first position, a center of the first magnet is aligned with a center of the Hall sensor; while the actuating assembly is at the second position, a center of the second magnet is aligned with the center of the Hall sensor.

4. The apparatus of claim 2, further comprising a holder sleeved on a periphery of the actuating lever; wherein a receiving hole configured to receive the magnetic field generating portion is defined in the holder.

5. The apparatus of claim 1, wherein the second control member for the energy feedback comprises:

a movable portion, fixed to the actuating assembly and movable synchronously with the back-and-forth movement of the actuating assembly;

a laser sensor, fixed on an inner wall of the housing, and configured to detect and output a real-time distance signal of the movable portion; wherein the real-time distance signal is configured to indicate a real-time distance between the movable portion and the laser sensor; and a controller, electrically connected to the laser sensor and a motor, and configured to convert the real-time distance signal into the braking depth signal and control the energy feedback based on the braking depth signal.

6. The apparatus of claim 1, wherein the first control member for the stop lamp further comprises:

a second stationary contact, fixed in the housing;

a second movable contact, fixed on the actuating assembly; wherein the second movable contact is slidable back and forth along the second stationary along with the back-and-forth movement of the actuating assembly; and a normally closed signal terminal, electrically connected to the second stationary contact.

7. The apparatus of claim 1, wherein the housing comprises:

a base, comprising:
- a first shell, opened at one end;
- a second shell, connected to the first shell; and
- a connecting plate, connected between the first shell and the second shell, and configured to separate the first shell from the second shell; wherein the first elastic member and the second elastic member are respectively fixedly connected to the connecting plate; and a cover, disposed on the base; wherein the base and the cover cooperatively define a receiving space; the actuating assembly, the first control member for the stop lamp and the second control member for the energy feedback are received in the receiving space.

8. The apparatus of claim 7, wherein the cover comprises:

a cover body, disposed on the first shell and abutting against the connecting plate; and a hollow guide portion, extending from the cover body in a direction away from the connecting plate; wherein the actuating lever is at least partially disposed in the guide portion.

9. The apparatus of claim 7, wherein the housing further comprises a first guide post and a second guide post extending from the connecting plate in a direction toward the actuating assembly; the second guide post is sleeved on an outer side of the first guide post; a length of the second guide post is less than a length of the first guide post;

wherein the first elastic member is located between the first guide post and the second guide post, while the second elastic member is sleeved on the second guide post.

10. A braking system, comprising:

a brake pedal, comprising a pedal body and a pedal arm connected to the pedal body;

a bracket, wherein a gap is defined by the bracket and the pedal arm;

an apparatus for controlling energy feedback, connected to the bracket, and comprising:
- a housing;
- an actuating assembly, received in the housing and movable back and forth between a first position and a second position along an axial direction of the housing;
- a first control member for a stop lamp, received in the housing and configured to trigger the stop lamp to be turned on or off along with a back-and-forth movement of the actuating assembly; and
- a second control member for energy feedback, at least partially received in the housing;

wherein the second control member for the energy feedback is configured to acquire a braking depth signal of a brake pedal in real time based on the back-and-forth movement of the actuating assembly, and control the energy feedback based on the braking depth signal; and a bump, disposed on the brake pedal, received in the gap defined by the pedal arm and the bracket, and configured to press or separate from the apparatus for controlling energy feedback wherein the actuating assembly comprises:
- an actuating lever, received in the housing;
- a first elastic member, expandable and compressible along the axial direction of the housing; wherein one end of the first elastic member abuts against the housing, and the other end of the first elastic member abuts against the actuating lever; and
- a second elastic member, expandable and compressible along the axial direction of the housing; wherein the second elastic member is sleeved on the first elastic member; one end of the second elastic member abuts against the housing; the other end of the second elastic member abuts against the actuating lever in a condition that the actuating lever is at the first position, and moves to a position at which the stop lamp is turned on by the first control member for the stop lamp in a condition that the actuating lever is at the second position; a length of the second elastic member is less than a length of the first elastic member;

wherein the first control member for the stop lamp comprises:
- a first stationary contact, fixed in the housing;
- a first movable contact, fixed on the second elastic member; wherein the first movable contact is movable back and forth along with an expansion and compression of the second elastic member, such that the first movable contact is capable of being in contact with or separated from the first stationary contact; and
- a normally open signal terminal, electrically connected to the first stationary contact.

11. The braking system of claim 10, wherein the second control member for the energy feedback comprises:

a magnetic field generating portion, fixed to the actuating assembly, movable synchronously along with the back-and-forth movement of the actuating assembly, and configured to generate a magnetic field;

a Hall sensor, fixed on one side of an inner wall of the housing that is adjacent to the magnetic field generating portion, and configured to detect a change in strength of the magnetic field around the Hall sensor and output a real-time voltage signal; and a controller, electrically connected to the Hall sensor and a motor, and configured to convert the real-time voltage signal into the braking depth signal and control the energy feedback in real time based on the braking depth signal; or the second control member for the energy feedback comprises:
a movable portion, fixed to the actuating assembly and movable synchronously with the back-and-forth movement of the actuating assembly;
a laser sensor, fixed on an inner wall of the housing, and configured to detect and output a real-time distance signal of the movable portion; wherein the real-time distance signal is configured to indicate a real-time distance between the movable portion and the laser sensor; and
a controller, electrically connected to the laser sensor and a motor, and configured to convert the real-time distance signal into the braking depth signal and control the energy feedback based on the braking depth signal.

12. The braking system of claim 11, wherein the magnetic field generating portion comprises a first magnet and a second magnet spaced apart from each other; the first magnet and the second magnet are successively disposed in a direction from the second position toward the first position along the axial direction of the housing;
when the actuating assembly is at the first position, a center of the first magnet is aligned with a center of the Hall sensor; while the actuating assembly is at the second position, a center of the second magnet is aligned with the center of the Hall sensor.

13. The braking system of claim 10, wherein the first control member for the stop lamp comprises:
a second stationary contact, fixed in the housing;
a second movable contact, fixed on the actuating assembly; wherein the second movable contact is slidable back and forth along the second stationary along with the back-and-forth movement of the actuating assembly; and
a normally closed signal terminal, electrically connected to the second stationary contact.

14. The braking system of claim 10, wherein the housing comprises:
a base, comprising:
a first shell, opened at one end;
a second shell, connected to the first shell; and
a connecting plate, connected between the first shell and the second shell, and configured to separate the first shell from the second shell; wherein the first elastic member and the second elastic member are respectively fixedly connected to the connecting plate; and
a cover, disposed on the base; wherein the base and the cover cooperatively define a receiving space; the actuating assembly, the first control member for the stop lamp and the second control member for the energy feedback are received in the receiving space.

15. A vehicle, comprising a battery and a braking system electrically connected to the battery, wherein the braking system comprises:
a brake pedal, comprising a pedal body and a pedal arm connected to the pedal body;
a bracket, wherein a gap is defined by the bracket and the pedal arm;
an apparatus for controlling energy feedback, connected to the bracket, and comprising:
a housing;
an actuating assembly, received in the housing and movable back and forth between a first position and a second position along an axial direction of the housing;
a first control member for a stop lamp, received in the housing and configured to trigger the stop lamp to be turned on or off along with a back-and-forth movement of the actuating assembly; and
a second control member for energy feedback, at least partially received in the housing;
wherein the second control member for the energy feedback is configured to acquire a braking depth signal of a brake pedal in real time based on the back-and-forth movement of the actuating assembly, and control the energy feedback based on the braking depth signal; and
a bump, disposed on the brake pedal, received in the gap defined by the pedal arm and the bracket, and configured to press or separate from the apparatus for controlling energy feedback;
wherein the actuating assembly comprises:
an actuating lever, received in the housing;
a first elastic member, expandable and compressible along the axial direction of the housing; wherein one end of the first elastic member abuts against the housing, and the other end of the first elastic member abuts against the actuating lever; and
a second elastic member, expandable and compressible along the axial direction of the housing; wherein the second elastic member is sleeved on the first elastic member; one end of the second elastic member abuts against the housing; the other end of the second elastic member abuts against the actuating lever in a condition that the actuating lever is at the first position, and moves to a position at which the stop lamp is turned on by the first control member for the stop lamp in a condition that the actuating lever is at the second position; a length of the second elastic member is less than a length of the first elastic member;
wherein the first control member for the stop lamp comprises:
a first stationary contact, fixed in the housing;
a first movable contact, fixed on the second elastic member; wherein the first movable contact is movable back and forth along with an expansion and compression of the second elastic member, such that the first movable contact is capable of being in contact with or separated from the first stationary contact; and
a normally open signal terminal, electrically connected to the first stationary contact.

16. The vehicle of claim 15, wherein the second control member for the energy feedback comprises:
a magnetic field generating portion, fixed to the actuating assembly, movable synchronously along with the back-and-forth movement of the actuating assembly, and configured to generate a magnetic field;
a Hall sensor, fixed on one side of an inner wall of the housing that is adjacent to the magnetic field generating portion, and configured to detect a change in strength of the magnetic field around the Hall sensor and output a real-time voltage signal; and a controller, electrically connected to the Hall sensor and a motor, and configured to convert the real-time voltage signal into the braking depth signal and control the energy feedback in real time based on the braking depth signal; or the second control member for the energy feedback comprises:

a movable portion, fixed to the actuating assembly and movable synchronously with the back-and-forth movement of the actuating assembly;

a laser sensor, fixed on an inner wall of the housing, and configured to detect and output a real-time distance signal of the movable portion; wherein the real-time distance signal is configured to indicate a real-time distance between the movable portion and the laser sensor; and a controller, electrically connected to the laser sensor and a motor, and configured to convert the real-time distance signal into the braking depth signal and control the energy feedback based on the braking depth signal.

17. The vehicle of claim 15, wherein the housing comprises:

a base, comprising:
  a first shell, opened at one end;
  a second shell, connected to the first shell; and
  a connecting plate, connected between the first shell and the second shell, and configured to separate the first shell from the second shell; wherein the first elastic member and the second elastic member are respectively fixedly connected to the connecting plate; and a cover, disposed on the base; wherein the base and the cover cooperatively define a receiving space; the actuating assembly, the first control member for the stop lamp and the second control member for the energy feedback are received in the receiving space.

18. The apparatus of claim 2, wherein the first control member for the stop lamp further comprises a Hall switch fixed to the inner wall of the housing and spaced apart from the Hall sensor along the axial direction of the housing, configured to be switched on or off based on the movement of the actuating assembly.

* * * * *